United States Patent [19]
Lee

[11] Patent Number: 5,606,375
[45] Date of Patent: Feb. 25, 1997

[54] METHOD FOR ENHANCING DETAIL IN COLOR SIGNALS AND CIRCUITRY FOR IMPLEMENTING THAT METHOD IN COLOR VIDEO EQUIPMENT

[75] Inventor: Hyo-seung Lee, Seoul, Rep. of Korea

[73] Assignee: Samsung Electronics Co. Ltd., Suwon, Rep. of Korea

[21] Appl. No.: 330,705

[22] Filed: Oct. 26, 1994

[30]     Foreign Application Priority Data

Aug. 31, 1994 [KR] Rep. of Korea ..................... 94-22076

[51] Int. Cl.$^6$ ................................ H04N 5/18; H04N 5/21
[52] U.S. Cl. .......................... 348/606; 348/607; 348/623
[58] Field of Search ..................................... 348/606, 607, 348/609, 618, 621, 623, 624; H04N 5/18, 5/21

[56] References Cited

U.S. PATENT DOCUMENTS

| | | | |
|---|---|---|---|
| 4,573,075 | 2/1986 | Bolger | 348/623 |
| 4,962,426 | 10/1990 | Naoi et al. | 348/623 |
| 5,025,312 | 6/1991 | Faroudja | 348/623 |

*Primary Examiner*—Victor R. Kostak
*Assistant Examiner*—Glenton B. Burgess

[57]           ABSTRACT

In video signal processing circuitry detail enhancement is done on each of three color channels in response to the detail information, the enhancement of the detail in each color channel being done in reliance on separated high-spatial-frequency information originally contained in that channel, as long as it is sufficiently greater in amplitude than a reference level somewhat above that expected for thermal noise. When the amplitude of the detail information originally contained in a channel is insufficiently above that reference level, the thermal noise is suppressed by subtracting the separated high-spatial-frequency information therefrom. The same filter arrangements are used to separate high-spatial-frequency information for suppressing thermal noise in each color channel as for enhancing the detail in each color channel.

24 Claims, 13 Drawing Sheets

METHOD FOR ENHANCING DETAIL IN COLOR SIGNALS AND CIRCUITRY FOR IMPLEMENTING THAT METHOD IN COLOR VIDEO EQUIPMENT

The present invention relates to a method for enhancing detail in color signals and circuitry for implementing that method in color video equipment, such as color video cameras.

BACKGROUND OF THE INVENTION

Spatial frequency is a measure of how rapidly a parameter changes over distance in a prescribed spatial direction and is analogous to temporal frequency, which is a measure of how rapidly a parameter changes with the passage of time. In television systems using horizontal scanning lines, horizontal space is conformally mapped to time by the scanning process, so horizontal spatial frequency of the televised image intensity conformally maps to temporal frequency in the video signal descriptive of the televised image.

In video cameras using a single pickup device, a color pattern filter may be used to filter the light reaching the pickup device so that color signals can be extracted from the electrical signal supplied by the pickup device. The color pattern filter customarily contains stripes transmitting light of three different colors to the pickup device, which may be a vidicon or may be a solid-state imager such as line-transfer charge-coupled device. The direction of the stripes is perpendicular to the direction of line scan in the camera, line scan conventionally being in a horizontal direction. The stripes of each color are of uniform width, but the stripes of different colors are preferably of different widths to simplify the separation of color components from the output signal of the pickup device. The respective widths associated with the different colors are usually scaled in regard to the contribution of the particular color to luminance—that is, to reference white. If the color filter comprises red-transmissive, green-transmissive and blue-transmissive stripes, for example, the green-transmissive stripes will be the widest and the blue-transmissive stripes will be the narrowest. The signals picked up by the narrower width stripes have poorer signal-to-noise ratio (S/N), particularly in the higher horizontal spatial frequencies containing detail. When the video camera is used with a video transmission system where the color signals are converted to wideband luminance and narrowband color-difference signals, the poorer S/N of the colors contributing less to luminance is not of much concern, since detail enhancement or video peaking is usually carried out on the shared luminance high frequencies rather than on individual color signals.

However, the video camera can be used with video equipment in which the color signals are not combined to form luminance and color-difference signals—e.g. certain digital video transmission systems of the so-called RGB type where the red (R), green (G) and blue (B) color signals are separately digitized and coded. In such equipment detail enhancement or video peaking is apt to be done on the red (R), green (G) and blue (B) color signals themselves. Since the human visual system discriminates poorly between colors of detail as details become finer, the enhancement of the color details that have poorer S/N with the color details that have better S/N can result in images that have less apparent noise in them. Random noise in the green (G) color signal is not correlated with random noise in the red (R) and blue (B) color signals, so on average the random noise component of the G signal and the random noise component of another color signal add as quadrature vectors rather than in-phase vectors, which apparently helps the high-frequency S/N when enhancing the detail of that other color signal.

FIG. 1 shows detail enhancement circuitry used in the prior art, in which an image signal input to the green (G) channel is delayed by cascaded first and second delay lines 1 and 2, each providing a delay equal to the duration (1H) of a horizontal scan line. Thereafter, the original (undelayed) image signal, a first output image signal delayed by 1 H period by the first 1 H delay line 1, and a second output image signal delayed 2 H periods by means of the first and second 1 H delay lines 1 and 2 are applied to a vertical highpass filter (V HPF) weight-and-sum circuit 3 for extracting a vertical detail component. Meanwhile, the 1 H-delayed image signal delayed by the first 1 H delay line is also applied to a horizontal highpass filter (H HPF) 4, thereby extracting a horizontal detail component.

The vertical detail component supplied from the V HPF 3 is filtered by a horizontal lowpass filter (H LPF) 5 to prevent diagonal detail from being excessively enhanced, as will be explained in more detail further on in this specification. Then, the detail components respectively extracted by H HPF 4 and by H LPF 5 are summed in an adder 6, to be applied as addressing to a read-only memory (ROM) 7 storing a look-up table (LUT).

The LUT stored in ROM 7 executes a process having a system characteristic which is related to the detail component level of the image signal. This process may take several forms, ranging from a simple linear amplification of the detail component to a non-linear attenuation of the noise component included in the detail component. Such a process can also include coring of the detail component at a level somewhat above its thermal noise level, thus providing a video detail signal in which thermal noise is suppressed to the enhanced-detail signal supplying means composed of second, third and fourth adders 8, 9 and 10. Also, the LUT stored in ROM 7 can execute a non-linear coring process. That is to say, input levels lower than the thermal noise level are set to zero while those higher than the thermal noise level are amplified to enhance the detail, and those much higher than the thermal noise level are attenuated to prevent over-enhancement of the detail.

The detail enhancement component supplied by the ROM 7 is added to each of the image signals of the red (R) and blue (B) channels, and to the output signal of the first delay line 1, in the second, third and fourth adders 8, 9 and 10, respectively. The summed image signals are then supplied as red, green and blue enhanced-detail signals R', G' and B' for the respective channels.

The detail enhancement circuit shown in FIG. 1 is designed such that, using H LPF 5, a diagonal detail component is not overly enhanced. That is to say, when bright pixels are distributed horizontally in the P1, P2 and P3 pixel positions in the 1 H line, as shown in FIG. 2A, the vertical detail component associated with these pixels is detected by V HPF 3; and there is no horizontal detail component associated with these pixels to be detected by H HPF 4. When bright pixels are distributed vertically in the P2 pixel position of the 0 H, 1 H and 2 H lines, as shown in FIG. 2B, the horizontal detail component associated with these pixels is detected by H HPF 4 and there is no vertical detail component associated with these pixels to be detected by V HPF 3. However, when bright pixels are distributed diagonally, as shown in FIG. 2C, the vertical detail component associated with these pixels is detected by V HPF 3 and the horizontal detail component detail component associated with these pixels is detected by H HPF 4. So diagonal detail enhancement is excessive if done in response to the summed responses of V HPF 3 and H HPF 4. Accordingly, a horizontal lowpass filter (H LPF) 5 is connected in cascade after V HPF 3 to perform a lowpass filtering operation that suppresses the vertical detail component when it is associated with a horizontal detail component and thereby curbs the undesirable tendency towards excessive detail enhancement. Isolated pixels differing from their neighbors are still enhanced excessively, however.

Delay (not shown in FIG. 1) must be included in the G input connection to the fourth adder 10 from the output connection of the 1 H delay line 1, in order to compensate for delay through H HPF 4; this delay can be provided by tapping the delay line 2, or replacing it by cascaded delay lines that in effect provide a tapped delay line 2. Respective delay lines (not shown in FIG. 1) are customarily included in the R input connection to the second adder 8 and in the B input connection to the third adder 9 to provide delays of the R and B signals compensating for the delay of the G signal as supplied to the fourth adder 10. The delay through H LPF 5 can compensate for the delay through H HPF 4.

In an alternative design for curbing the undesirable tendency towards excessive detail enhancement, which does not use H LPF 5, but instead supplies input signal to H HPF 4 from a vertical lowpass filter receiving input signals similar to V HPF 3, additional compensating delay has to be introduced after V HPF 3 and in each of the R, G and B inputs to the adders 8, 9 and 10. The FIG. 1 prior-art design for curbing the undesirable tendency towards excessive detail enhancement is the preferred one of these two equivalents because of its reduced requirement for compensating delay, particularly after V HPF 3.

There are problems with the FIG. 1 detail enhancement circuit having to do with detail enhancement, or peaking, reducing the signal-to-noise ratio (S/N) of images reproduced from the red, green and blue enhanced-detail signals R', G' and B'. This is the reason that the measurement of the S/N ratio of devices including a detail enhancement circuit (e.g., a camera) is customarily done so that detail enhancement is not done at the same time. The human visual system tends to ignore reduced S/N in the presence of detail, but is quite sensitive to high-spatial-frequency noise occurring in areas of an image where there is relatively little detail. Arranging for the LUT stored in the ROM 7 to supply a cored video detail signal avoids much of the reduction of S/N otherwise caused by enhancing detail. However, it still may be desirable to core the R', G' and B' signals to reduce their high-spatial-frequency noise content under conditions where there is not appreciable detail enhancement, when these signals are generated from R, G and B signals originating from a video camera receiving little light, for example.

There are also problems with the FIG. 1 detail enhancement circuit having to do with enhancement of the horizontal and vertical detail components in each of the red (R), green (G) and blue (B) channels depending solely on the image signal of the green (G) channel. The detail enhancement suitable for the characteristics of the respective channels is not achieved. By way of example, detailed red and blue color patterns cannot be enhanced, since there are no green details with which to provide enhancement.

The inventor has found that enhancement of the red (R) channel details can be carried out satisfactorily in response to the details originally appearing in the red (R) channel, without unacceptably lowering high-frequency signal-to-noise ratio in the red (R) channel, if noise coring of the red (R) channel details is done properly. The inventor has also found that enhancement of the blue (B) channel details can be carried out in response to the details originally appearing in the blue (B) channel, without unacceptably lowering high-frequency S/N in the blue (B) channel, if noise coring of the blue (B) channel details is done properly. Noise coring of the green (G) channel details also improves high-frequency S/N in that channel. Accordingly, it is possible to enhance the red (R) channel details in response to the details originally appearing in the red (R) channel and to enhance of the blue (B) channel details in response to the details originally appearing in the blue (B) channel, as well as to enhance the green (G) channel details in response to the details originally appearing in the green (G) channel, which procedure avoids problems with the prior art detail enhancement circuit caused by details that are not related primarily to luminance variation.

The red (R) channel high frequencies, separated for use in enhancing detail, can also be used for suppressing high-frequency noise in the red (R) channel when there is very little or no red detail. The green (G) channel high frequencies, separated for use in enhancing detail, can also be used for suppressing high-frequency noise in the green (G) channel when there is very little or no green detail. And the blue (B) channel high frequencies, separated for use in enhancing detail, can also be used for suppressing high-frequency noise in the blue (B) channel when there is very little or no blue detail. This noise-suppression scheme for the fullband R, G and B color signals is useful even when they are subsequently matrixed into a composite video signal using mixed highs.

SUMMARY OF THE INVENTION

In video signal processing circuitry detail enhancement is done on each of three color channels in response to the detail information, the enhancement of the detail in each color channel being done in reliance on separated high-spatial-frequency information originally contained in that channel, as long as it is sufficiently above thermal noise level. When the detail information originally contained in a channel is insufficiently above thermal noise level, the thermal noise is suppressed by subtracting the separated high-spatial-frequency information therefrom. The same filter arrangements are used to separate high-spatial-frequency information for suppressing thermal noise in each color channel as for enhancing the detail in each color channel.

A detail enhancement method embodying an aspect of the invention comprises the steps of: extracting horizontal and vertical detail components included in the image signal supplied from at least one channel among the red, green and blue channels; canceling noise by coring the horizontal and vertical detail components supplied for the respective channels if the magnitudes of the horizontal and vertical detail components extracted in the extracting step are lower than the reference value for noise identification, and determining the detail enhancement amount corresponding to the magnitudes of the horizontal and vertical detail components supplied for the respective channels if the magnitudes of the horizontal and vertical detail components extracted in the extracting step are higher than the reference value for noise identification; and supplying an enhanced-detail image signal for the respective channels obtained by summing the 1 H-delayed signal of the image signal supplied from at least one channel among the red, green and blue channels, with the horizontal/vertical detail components whose detail enhancement amount is determined, or whose noise is canceled, in the canceling and determining step.

Detail enhancement circuitry embodying an aspect of the invention comprises: extracting means for extracting horizontal and vertical detail components included in the image signal supplied from at least one channel among the red, green and blue channels; noise canceling and detail enhancement amount determining means for canceling noise by coring the horizontal and vertical detail components supplied for the respective channels if the magnitudes of the horizontal and vertical detail components extracted in the extracting means are lower than the reference value for noise identification, and for determining the detail enhancement amount corresponding to the magnitudes of the horizontal and vertical detail components supplied for the respective channels if the magnitudes of the horizontal and vertical detail components extracted in the extracting means are higher than the reference value for noise identification; and supplying means for supplying an enhanced-detail image signal for the respective channels obtained by summing the 1 H-delayed signal of the image signal supplied from at least one channel among the red, green and blue channels, with the horizontal/vertical detail components whose detail enhancement amount is determined, or whose noise is canceled, in the noise canceling and detail enhancement amount determining means.

DETAILED DESCRIPTION OF THE INVENTION

Figure 3:
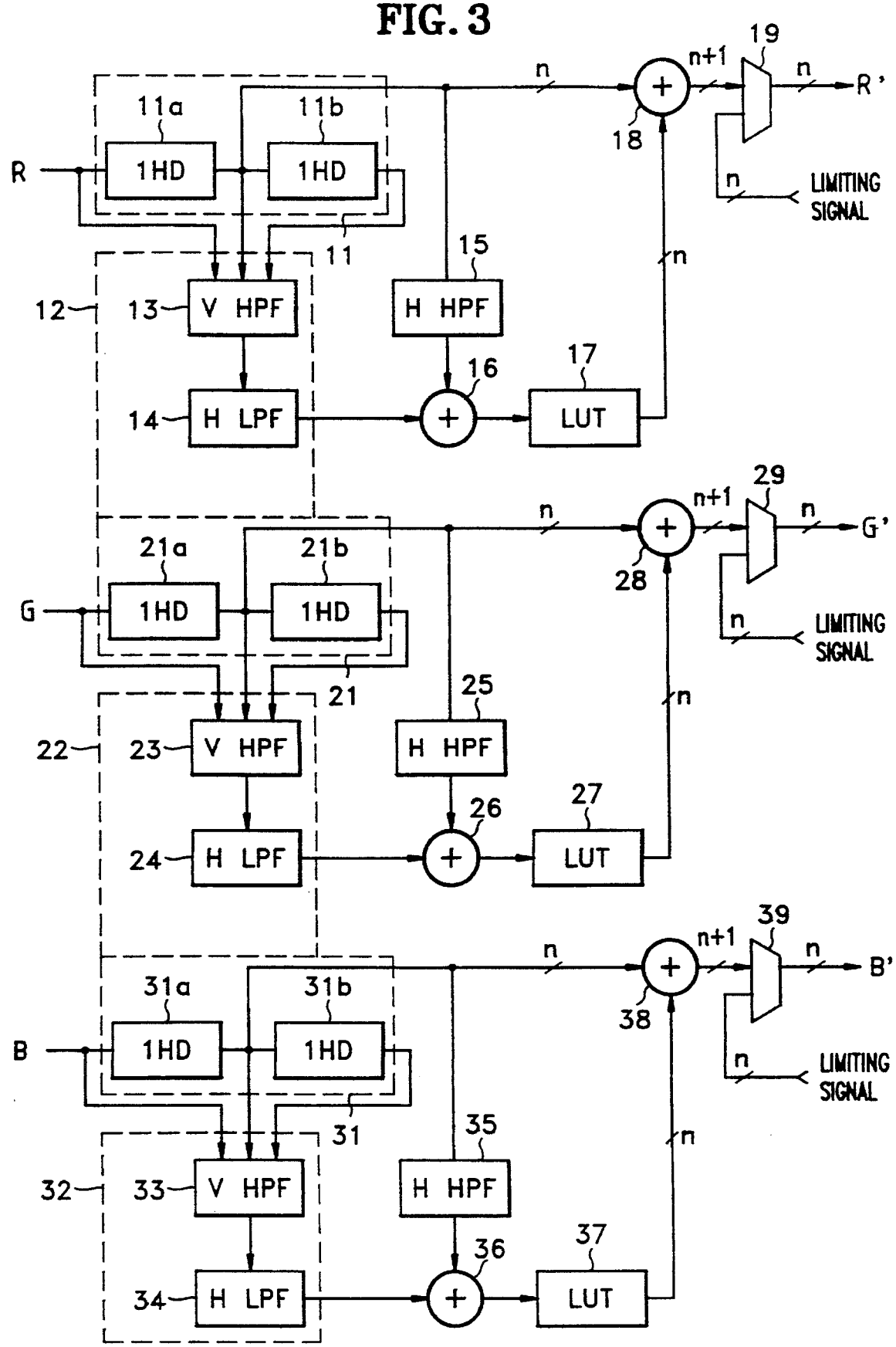
FIG. 3 is a block diagram of a detail enhancement circuit according to a first embodiment of the invention.

The detail enhancement circuit shown in FIG. 3 includes delay means 11, 21 and 31; vertical detail component extracting means 12, 22 and 32; horizontal detail component extracting means 15, 25 and 35; horizontal/vertical detail component summing means 16, 26 and 36; read-only memories 17, 27 and 37 each storing noise-coring and detail-enhancement amount determining look-up tables (LUTs); enhanced-detail signal supplying means 18, 28 and 38; and digital limiters 19, 29 and 39. The elements with identification numerals in the teens are used for enhancing details in the red (R) channel; the elements with identification numerals in the twenties are used for enhancing details in the green (G) channel; and the elements with identification numerals in the thirties are used for enhancing details in the blue (B) channel. The delay means 11 in the red channel comprises a first 1 H delay line 11a and a second 1 H delay line 11b; the delay means 21 in the green channel comprises a first 1 H delay line 21a and a second 1 H delay line 21b; and the delay means 31 in the blue channel comprises a first 1 H delay line 31a and a second 1 H delay line 31b. The vertical detail component extracting means 12 in the red channel comprises a vertical highpass filter 13 and a horizontal lowpass filter 14, the vertical detail component extracting means 22 in the green channel comprises a vertical highpass filter 23 and a horizontal lowpass filter 24, and the vertical detail component extracting means 32 in the blue channel comprises a vertical highpass filter 33 and a horizontal lowpass filter 34. While the responses of the 1 H delay lines 11a, 21a and 31a are shown as being applied directly without further delay to the adders 18, 28 and 38, they are in actuality further delayed to compensate for delays in the filters 14, 15, 24, 25, 34 and 35.

The red, green and blue image signals respectively supplied to the delay means 11, 21 and 31 are gamma-corrected signals. In the delay means 11, 21 and 31, the first 1 H delay lines 11a, 21a and 31a respectively delay the red, green and blue image signals each by a 1 H period. The second 1 H delay lines 11b, 21b and 31b respectively delay the 1 H-delayed image signals supplied from the first 1 H delay lines 11a, 21a and 31a each by another 1 H period. In the vertical detail component extracting means 12, 22 and 32, the first filters 13, 23 and 33 perform a vertical highpass filtering operation with respect to the original signal, the 1 H-delayed signal and the 2 H-delayed signal for the red, green and blue channels respectively supplied from the delay means 11, 21 and 31, thereby extracting the vertical detail components present in a predetermined high-frequency band. Then, in order to prevent a double enhancement of diagonal detail components, the second filters 14, 24 and 34 perform a horizontal lowpass filtering operation with respect to the vertical detail components supplied from the first filters 13, 23 and 33, for the red, green and blue channels, respectively. The diagonal detail components contained in the vertical detail components supplied from the first filters 13, 23 and 33 are suppressed in the responses of the second filters 14, 24 and 34. The horizontal detail component extracting means 15, 25 and 35 perform a horizontal highpass filtering operation with respect to the 1 H-delayed signal supplied from the delay means 11, 21 and 31 for the red, green and blue channels, respectively, thereby extracting the horizontal detail components present in a predetermined high-frequency band. The horizontal/vertical detail component summing means 16, 26 and 36 sum the vertical detail components supplied from the vertical detail component extracting means 12, 22 and 32 with the horizontal detail components supplied from the horizontal detail component extracting means 15, 25 and 35, for the respective red, green and blue channels. The summed outputs are applied to the read-only memories 17, 27 and 37 each storing combined noise-coring and detail-enhancement look-up tables. The table entries are supplied from the ROMs 17, 27 and 37 in the form of two's complement numbers.

In the FIG. 3 detail enhancement circuit the red (R) channel details are enhanced in response to the details originally appearing in the red (R) channel; the blue (B) channel details are enhanced in response to the details originally appearing in the blue (B) channel; and the green (G) channel details are enhanced in response to the details originally appearing in the green (G) channel. This procedure not only avoids problems with the prior art detail enhancement circuit that are caused by details not related primarily to luminance variation, but permits another operating advantage to be achieved.

Figure 1:
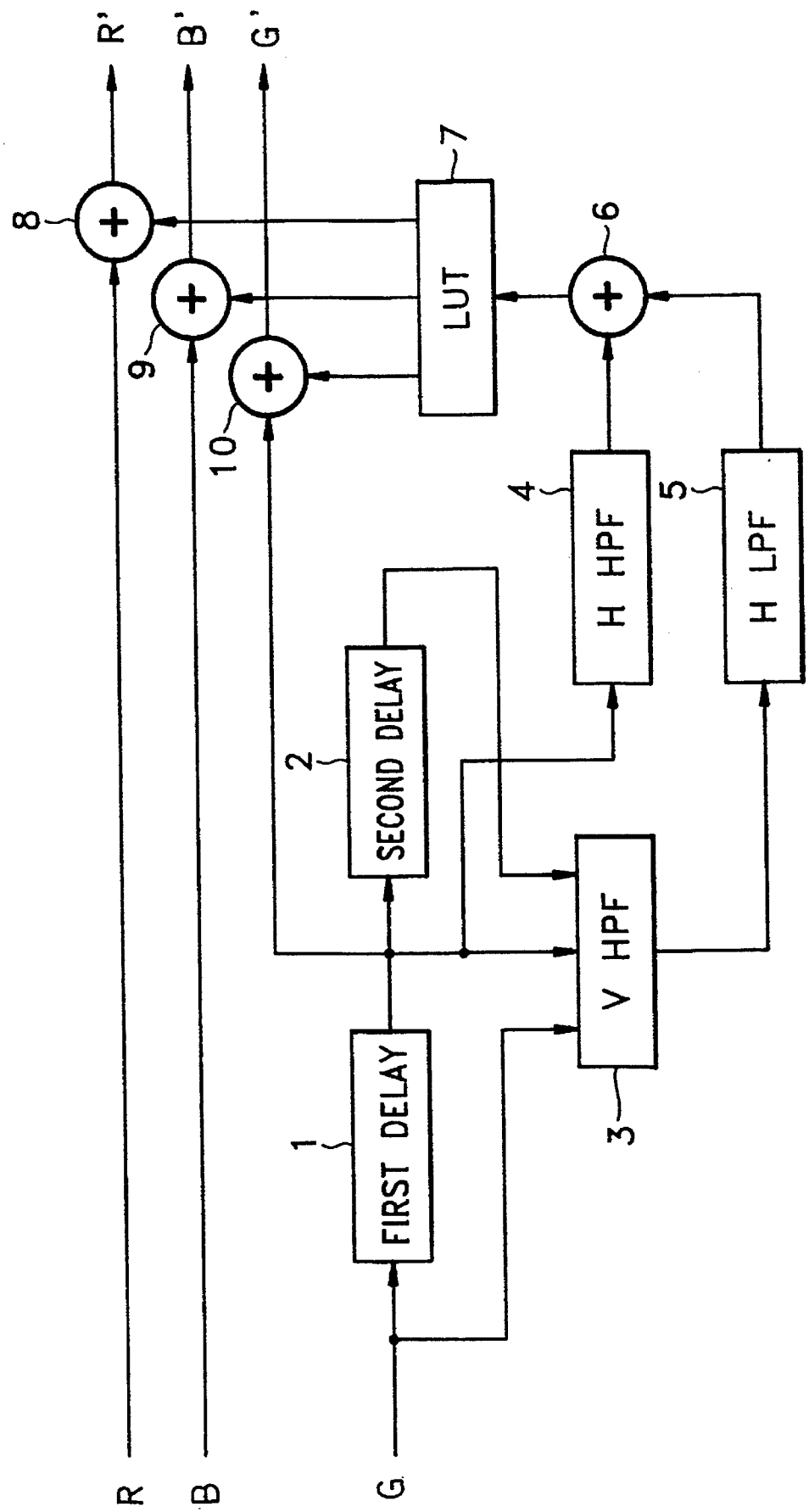
FIG. 1 is a block diagram of a prior-art detail enhancement circuit.
Figure 2A:
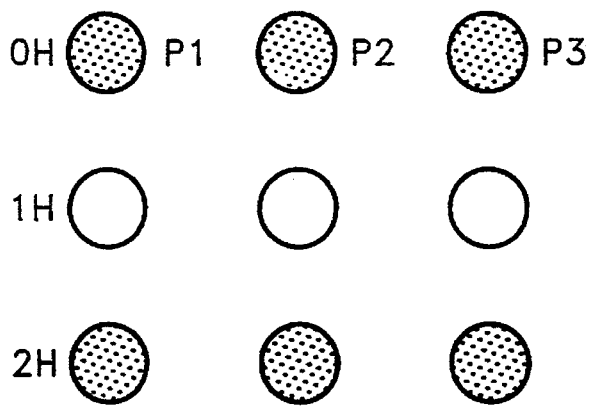
FIGS. 2A–2C show examples of the detection of vertical, horizontal and diagonal details, respectively, obtained according to the circuit of FIG. 1.
Figure 2B:
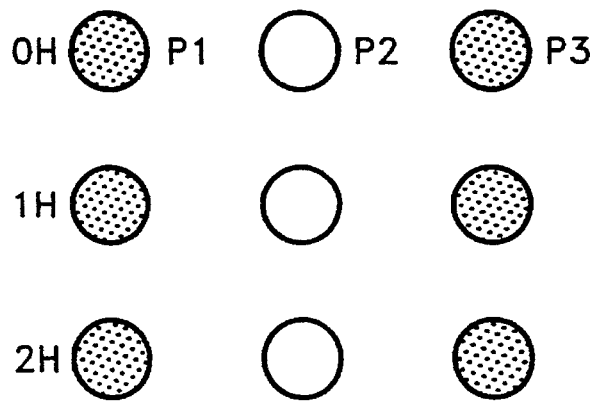
Figure 2C:
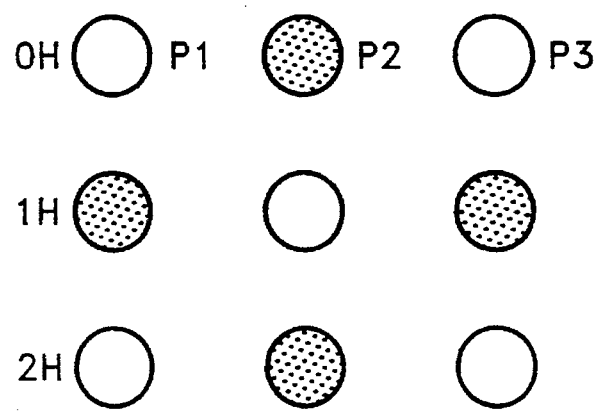

In the FIG. 1 detail enhancement circuit, when the high spatial-frequency content of any of the R, G and B signals is at low level, background thermal noise in that signal will appear in the corresponding R', G' or B' signal supplied from one of the adders 8, 9 and 10 despite the output from the ROM 7 being zero-valued under these conditions. In accordance with an aspect of the invention, in the FIG. 3 detail enhancement circuit the input-versus-output characteristics of the LUTs stored in the ROMs 17, 27 and 37 are such that thermal noise is reduced in the R', G' and B' signals when the high spatial-frequency components of the R, G and B signals are at low-level.

Figure 4:
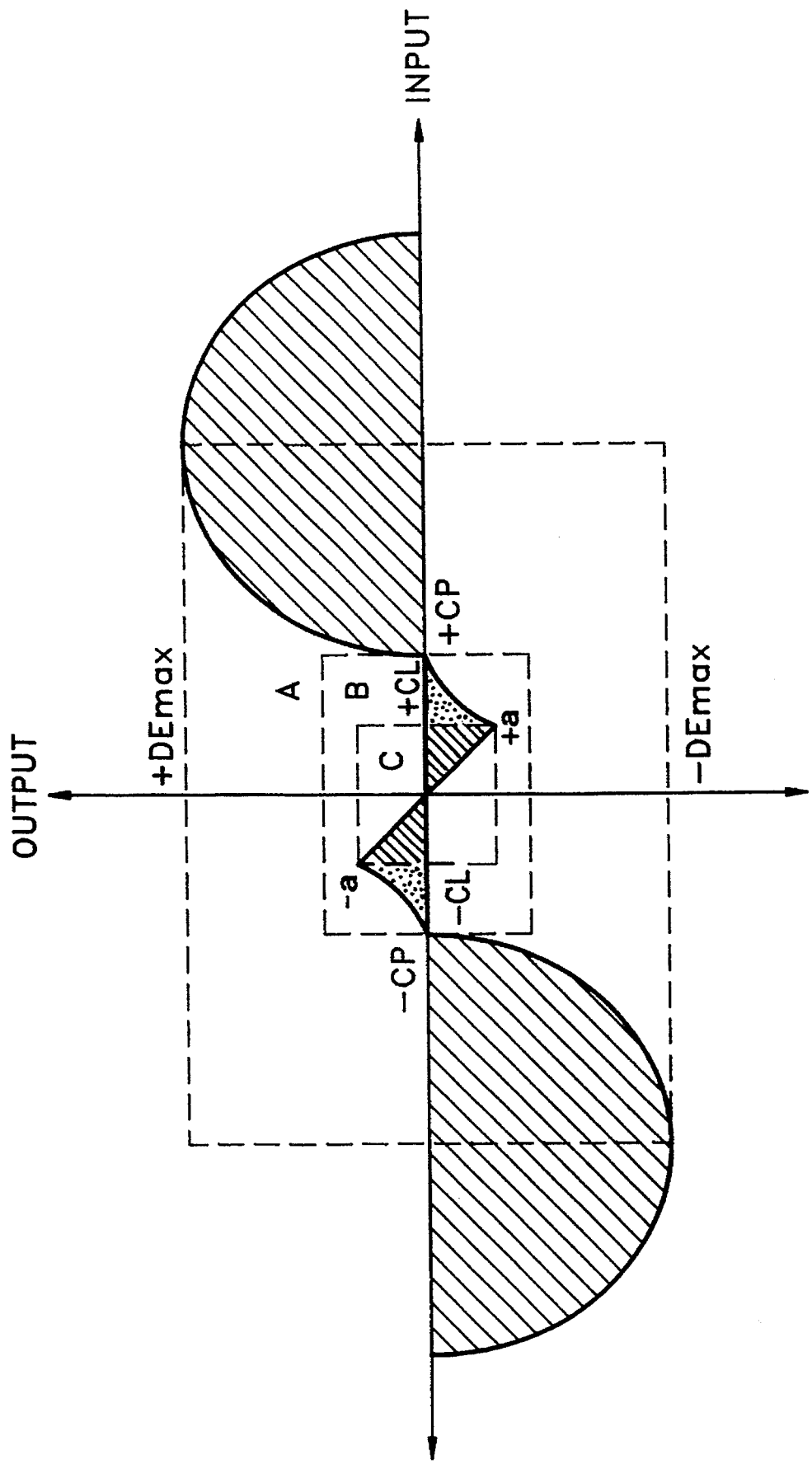
FIG. 4 is a graph showing the input versus output characteristics of a look-up table stored in a read-only memory 58 in the FIG. 3 detail enhancement circuit.

FIG. 4 graphs the input versus output characteristics of the LUTs stored in the ROMs 17, 27 and 37 in FIG. 3. The input signals (the abscissa) are divided into a section A, a section B and a section C, and a critical point (CP) represents a boundary value between the sections A and B, that is, a reference value for noise identification. If the signal level applied to one of the ROMs 17, 27 and 37 storing the noise-canceling and detail enhancement LUTs is greater than +CP or less than −CP (i.e., is within the A region), the LUT stored within the ROM determines the corresponding amount of detail enhancement, ranging from zero to the respective maximum detail enhancement amounts (+$DE_{max}$ and −$DE_{max}$) with respect to the magnitude of the input horizontal and vertical detail components, as shown in FIG. 4, and supplies the determined detail enhancement amount. On the other hand, if the signal level applied to one of the ROMs 17, 27 and 37 is less than +CP or greater than −CP (i.e., is within the B or C region), the LUT stored within the ROM functions for canceling the high-spatial-frequency noise.

When operating entirely within the operating region C of each of the ROMs 17, 27 and 37 its input addressing, which is within the range from −CL to +CL is primarily high-frequency noise; and its read-out inverts that high-frequency noise. When the input address to the ROM 17 is primarily high-frequency noise from the R signal, which is applied as one summand to the adder 18, the inverted high-frequency noise from the ROM 17, which is applied as another summand to the adder 18, cancels the high-frequency noise from the R' signal supplied from the adder 18. When the input address to the ROM 27 is primarily high-frequency noise from the G signal, which is applied as one summand to the adder 28, the inverted high-frequency noise from the ROM 27, which is applied as another summand to the adder 28, cancels the high-frequency noise from the G' signal supplied from the adder 28. When the input address to the ROM 37 is primarily high-frequency noise from the B signal, which is applied as one summand to the adder 38, the inverted high-frequency noise from the ROM 37, which is applied as another summand to the adder 38, cancels the high-frequency noise from the B' signal supplied from the adder 38.

That is to say, if input signal level to one of the ROMs 17, 27 and 37 is between −CL and +CL (i.e., is in the C region), the corresponding output signal level read from the ROM is the same amplitude as the input signal, but is of opposite polarity, as shown in FIG. 4. If input signal level to one of the ROMs 17, 27 and 37 is between −CP and −CL, or between +CL and +CP (i.e., is in the B region), the output signal level read from the ROM is expressed in the form of an exponentially decreasing function as the input signal level ranges upward from the +a point to the point on the abscissa corresponding to +CP, or ranges downward from the −a point to the point on the abscissa corresponding to −CP, as shown in FIG. 4.

When the high-frequency component of the signal R supplied from the adder 16 is within the range from −CP to +CP, but has excursions below −CL and above +CL so the ROM 17 addressing is substantially entirely within the operating regions B and C, the cancellation of the high-frequency component of the signal R in the R' signal supplied from the adder 18 is reduced, but there is no enhancement of red detail. When the high-frequency component of the signal G supplied from the adder 26 is within the range from −CP to +CP, but has excursions below −CL and above +CL so the ROM 27 addressing is substantially entirely within the operating regions B and C, the cancellation of the high-frequency component of the signal G in the G' signal supplied from the adder 28 is reduced, but there is no enhancement of green detail. When the high-frequency component of the signal B supplied from the adder 36 is within the range from −CP to +CP, but has excursions below −CL and above +CL so the ROM 37 addressing is substantially entirely within the operating regions B and C, the cancellation of the high-frequency component of the signal B in the B' signal supplied from the adder 38 is reduced, but there is no enhancement of blue detail.

When the high-frequency component of the signal R supplied from the adder 16 has substantial excursions below −CP and above +CP, so the ROM 17 addressing extends beyond the operating regions B and C and substantially into the operating region A, the high-frequency component of the signal R in the R' signal supplied from the adder 18 is augmented by the read-output of the ROM 17, enhancing red detail. When the high-frequency component of the signal R supplied from the adder 16 has excursions that extend ROM 17 addressing outside the operating region A, red detail enhancement is maximized and is reduced for still larger values of the high-frequency component of the signal R.

When the high-frequency component of the signal G supplied from the adder 26 has substantial excursions below −CP and above +CP, so the ROM 27 addressing extends beyond the operating regions B and C and substantially into the operating region A, the high-frequency component of the signal G in the G' signal supplied from the adder 28 is augmented by the read-output of the ROM 27, enhancing green detail. When the high-frequency component of the signal G supplied from the adder 26 has excursions that extend ROM 27 addressing outside the operating region A, green detail enhancement is maximized and is reduced for still larger values of the high-frequency component of the signal G.

When the high-frequency component of the signal B supplied from the adder 36 has substantial excursions below −CP and above +CP, so the ROM 37 addressing extends beyond the operating regions B and C and substantially into the operating region A, the high-frequency component of the signal B in the B' signal supplied from the adder 38 is augmented by the read-output of the ROM 37, enhancing blue detail. When the high-frequency component of the signal B supplied from the adder 36 has excursions that extend ROM 37 addressing outside the operating region A, blue detail enhancement is maximized and is reduced for still larger values of the signal B.

Per custom, the ROMs 17, 27 and 37 are addressed in and read from in two's complement arithmetic. Since the LUT stored in each of these ROMs is symmetrical about zero address, procedures in which the ROM is halved in size and is addressed by absolute values of input signal can be employed. The sign bit is saved and used to direct selective multiplying of the read-out by minus one in two's complement arithmetic when the original memory address was negative.

The following Table 1 shows an example of data output values read from the ROMs 17, 27 and 37 in FIG. 3 for various input values used in their addressing.

TABLE 1

| input value, i | absolute value | output value |
| --- | --- | --- |
| +10 | CP < i | +2 |
| +9 | CP < i | +1 |
| +8 | CP < i | +1 |
| +7 | CL < i < CP | 0 |
| +6 | CL < i < CP | −1 |
| +5 | CL < i < CP | −2 |
| +4 | CL < i < CP | −3 |
| +3 | i < CL | −3 |
| +2 | i < CL | −2 |
| +1 | i < CL | −1 |
| 0 | i < CL | 0 |
| −1 | i < CL | +1 |
| −2 | i < CL | +2 |
| −3 | i < CL | +3 |
| −4 | CL < i < CP | +3 |
| −5 | CL < i < CP | +2 |
| −6 | CL < i < CP | +1 |
| −7 | CL < i < CP | 0 |
| −8 | Cp < i | −1 |
| −9 | CP < i | −1 |
| −10 | Cp < i | −2 |

The example of the input and output values shown in Table 1 may take several forms depending on the number of signal processing bits, the input levels, and the intended degree of noise cancellation and detail enhancement.

Referring back to FIG. 3, the enhanced-detail signal supplying means 18, 28 and 38 sum the detail enhancement amount of the horizontal and vertical detail components determined from the LUTs stored in the ROMs 17, 27 and 37, with the 1 H-delayed signals from the delay means 11, 21 and. 31, for the red, green and blue channels, respectively. Then, the enhanced-detail signals R', G' and B' are supplied for the respective red, green and blue channels.

The digital limiters, or symmetrical clippers, 19, 29 and 39 each exhibit a self-limiting action that limits a (n+1)-bit signal to an n-bit signal for further adjusting the magnitude of the output. Considering an 8-bit system, there are two magnitude adjustments involved: namely, setting 128 and all numbers greater than 128 (or a preset level) to 127 (or a preset value), and setting −129 and all numbers less than −129 (or a preset level) to −128 (or a preset value).

The explanation of the enhanced-detail signal supplying means 18, 28 and 38 and the self-limiting action in the digital limiters 19, 29 and 39 will now be described in regard to six different operational examples with respect to red channel image signal in an n-bit (8-bit) system, wherein an input signal value (i) varies with respect to the CL and CP values and both positive and negative conditions of the LUT output of the ROM 17 are considered.

(1) If CL<i and the output of ROM 17 is negative, then,

LUT:−1; 1111 1111

1HD: +1; 0000 0001

Here, the 1 HD output of first 1 H delay line 11a may not be exactly the same as the LUT output of ROM 17, because high frequency components are extracted to be subsequently applied as input addressing to the ROM 17 and the DC components thereof are deleted. The operation of the enhanced-detail signal supplying means 18 is performed with respect to the DC components and the high-frequency components of the 1 HD output of he first 1 H delay line 11a and the LUT output from the ROM 17. This example illustrates the case when DC components are zero.

Step 1: Since the most significant bit is a sign bit, the 9th bit is extended by the 8th bit.

LUT; 1 1111 1111

1HD; 0 0000 0001

Step 2: The outputs of ROM 17 and first 1 H delay line 11a are summed, and the result thereof is supplied as "0 0000 0000". Thus, the high frequency value "1" of first 1 H delay line 11a is classified as noise to be canceled.

Step 3: This step is to limit at eight bits and the result thereof is supplied as "0000 0000".

(2) If CL<i and the output of ROM 17 is positive, then

LUT: +1; 0000 0001

1HD:−1; 1111 1111

Step 1: Since the most significant bit is a sign bit, the 9th bit is extended by the 8th bit.

LUT: 0 0000 0001

1HD: 1 1111 1111

Step 2: The outputs of the ROM 17 and the first 1 H delay line 11a are summed, and the result thereof is supplied as "0 0000 0000". The high frequency value "1" of the first 1 H delay line 11a is classified as noise to then be canceled.

Step 3: This step is to limit at eight bits and the result thereof is supplied as "0000 0000".

(3) If CL<i<CP and the output value of ROM 17 is negative, then

LUT:−3; 1111 1101

1HD: +4; 0000 0100

Step 1: Since the most significant bit is a sign bit, the 9th bit is extended by the 8th bit.

LUT: 1 1111 1101

1HD: 0 0000 0100

Step 2: The outputs of the ROM 17 and the first 1 H delay line 11a are summed, and the result thereof is supplied as "0 0000 0001". Thus, the high frequency value "4" of the first 1 H delay line 11a becomes "1".

Step 3: This step is to limit at eight bits and the result thereof is supplied as "0000 0001".

(4) If CL<i<CP and the output value of the ROM 17 is positive, then,

LUT: +3; 0000 0011

1HD:−4; 1111 1100

Step 1: Since the most significant bit is a sign bit, the 9th bit is extended by the 8th bit.

LUT: 0 0000 0011

1HD: 1 1111 1100

Step 2: The outputs of the ROM 17 and the first 1 H delay line 11a are summed, and the result thereof is supplied as "11111 1111". Thus, the high frequency value "−4" of the first 1 H delay line 11a becomes "−1".

Step 3: This step is to limit at eight bits and the result thereof is supplied as "1111 1111".

(5) If CP<i and the output of ROM 17 is negative, then,

LUT:−1; 1111 1111

1HD:−9; 1111 0111

Step 1: Since the most significant bit is a sign bit, the 9th bit is an extension from the 8th bit.

LUT: 1 1111 1111

1HD: 1 1111 0111

Step 2: The outputs of the ROM 17 and the first 1 H delay line 11a are summed, and the result thereof is supplied as "11111 0110". Thus, the high frequency value "−9" of the first 1 H delay line ROM 17 becomes "−10".

Step 3: This step is to limit at eight bits and the result thereof is supplied as "1111 0110".

(6) If CP<i and the output value of the ROM 17 is positive, then,

LUT: +1; 0000 0001

1HD: +9; 0000 1001

Step 1: Since the most significant bit is a sign bit, the 9th bit is extended by the 8th bit.

LUT: 0 0000 0001

1HD: 0 0000 1001

Step 2: The outputs of the ROM 17 and the first 1 H delay line 11a are summed, and the result thereof is supplied as "0 0000 1010". Thus, the high frequency value "9" of the first 1 H delay line 11a becomes "10".

Step 3: This step is to limit at eight bits and the result thereof is supplied as "0000 1010".

In the above examples, before starting the summing operation, the n-bit signal is replaced with an (n+1)-bit signal obtained by sign bit extension, in order to prevent sign changes owing to a carry operation, and the result of the summing operation is subsequently truncated to n bits by eliminating the sign bit extension.

In the FIG. 3 detail enhancement circuitry, depending on the magnitude of the horizontal and vertical detail components, the detail components are cored at a predetermined core level or are enhanced in accordance with the LUT entries stored in the ROMs 17, 27 and 37, the LUTs each having input/output characteristics as shown in FIG. 4. When detail enhancement is provided, the S/N ratio is reduced when detail is present, of course; but for a human being viewing an image reproduced from the R', G' and B' signals this reduction in S/N ratio is masked by the presence of detail. In portions of the image where there is little detail and the human visual system is sensitive to poor S/N ratio, the coring of the detail components of the R', G' and B' signals improves the signal-to-nose ratio.

Figure 5:
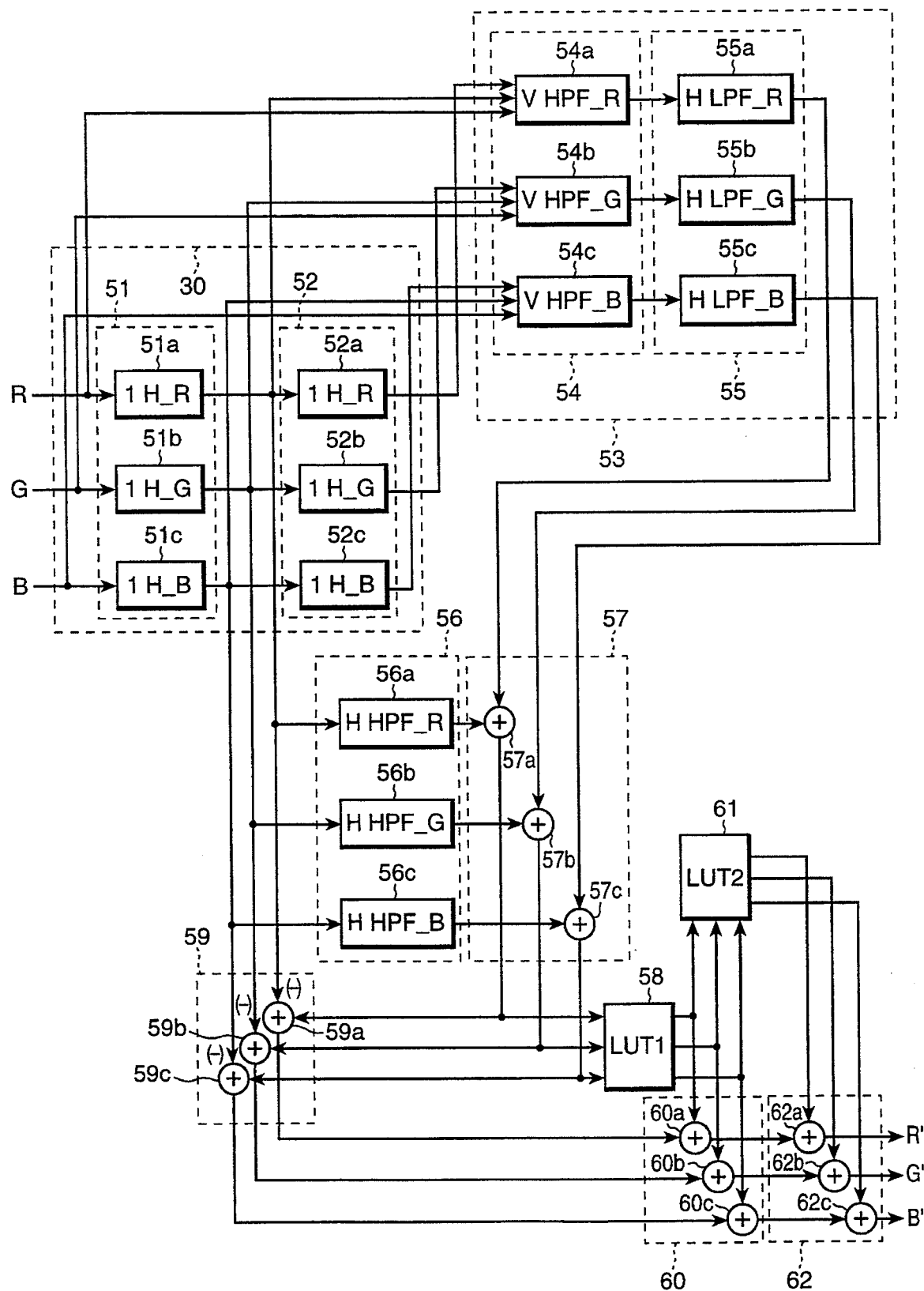
FIG. 5 is a block diagram of a detail enhancement circuit according to a second embodiment of the invention.

The FIG. 5 detail enhancement circuit basically includes delay means 50, vertical detail component extracting means 53, horizontal detail component extracting means 56, horizontal/vertical detail component summing means 57, a ROM 58 storing a noise-coring look-up table (LUT1), detail component canceling means 59, detail component summing means 60, a ROM 61 storing a detail-enhancement look-up table (LUT2), and enhanced-detail signal supplying means 62. The delay means 50 comprises a first delay line 51 for delaying the image signals of the red, green and blue channels each by 1 H and a second delay line 52 for further delaying by 1 H the 1 H-delayed image signals of the red, green and blue channels supplied from the first delay line 51. Further, the first delay 51 is composed of three 1 H delay lines 51a, 51b and 51c; and the second delay 52 is composed of three 1 H delay lines 52a, 52b and 52c.

The vertical detail component extracting means 53 comprises a first filter 54 for receiving an original signal, a 1 H-delayed signal and a 2 H-delayed signal for the respective red, green and blue channels, and performing a vertical highpass filtering operation with respect thereto; and a second filter 55 for performing a horizontal lowpass filtering operation with respect to the image signal supplied from the first filter 54, for the respective red, green and blue channels. Further, the first filter 54 is composed of three vertical highpass filters 54a, 54b and 54c, and the second filter 55 is composed of three horizontal lowpass filters 55a, 55b and 55c. The horizontal detail component extracting means 56 comprises three horizontal highpass filters 56a, 56b and 56c for performing a horizontal highpass filtering operation with respect to the image signal supplied from the first delay 51, for the red, green and blue channels, respectively. The horizontal/vertical detail component summing means 57 comprises three adders 57a, 57b and 57c for summing the output signal of the vertical detail component extracting means 53 with that of horizontal detail component extracting means 56, for the red, green and blue channels, respectively. The detail component canceling means 59 comprises three subtractors 59a, 59b and 59c for subtracting the output of the horizontal/vertical detail component summing means 57 from the 1 H-delayed image signal output of first delay 51, for the red, green and blue channels, respectively. The detail component summing means 60 comprises three adders 60a, 60b and 60c for summing the LUT1 output signal from the ROM 58 with the detail-free video signals from the detail component canceling means 59, for the red, green and blue channels, respectively. The enhanced-detail signal supplying means 62 comprises three adders 62a, 62b and 62c for summing the LUT2 output signal from the ROM 61 with the detail-free video signals supplied from the detail component summing means 60 for the red, green and blue channels.

The operation of the delay means 50 in the FIG. 5 circuitry corresponds to the collective operations of the delay means 11, 21 and 31 in the FIG. 3 circuitry. The operation of the vertical detail component extracting means 53 in the FIG. 5 circuitry corresponds to the collective operations of the vertical detail component extracting means 12, 22 and 32 in the FIG. 3 circuitry. The operation of the horizontal detail component extracting means 56 corresponds to the collective operations of the horizontal detail component extracting means 15, 25 and 35 in the FIG. 3 circuitry. And the operation of horizontal/vertical detail component summing means 57 corresponds to the collective operations of the horizontal/vertical detail component summing means 16, 26 and 36 in the FIG. 3 circuitry.

Figure 7A:
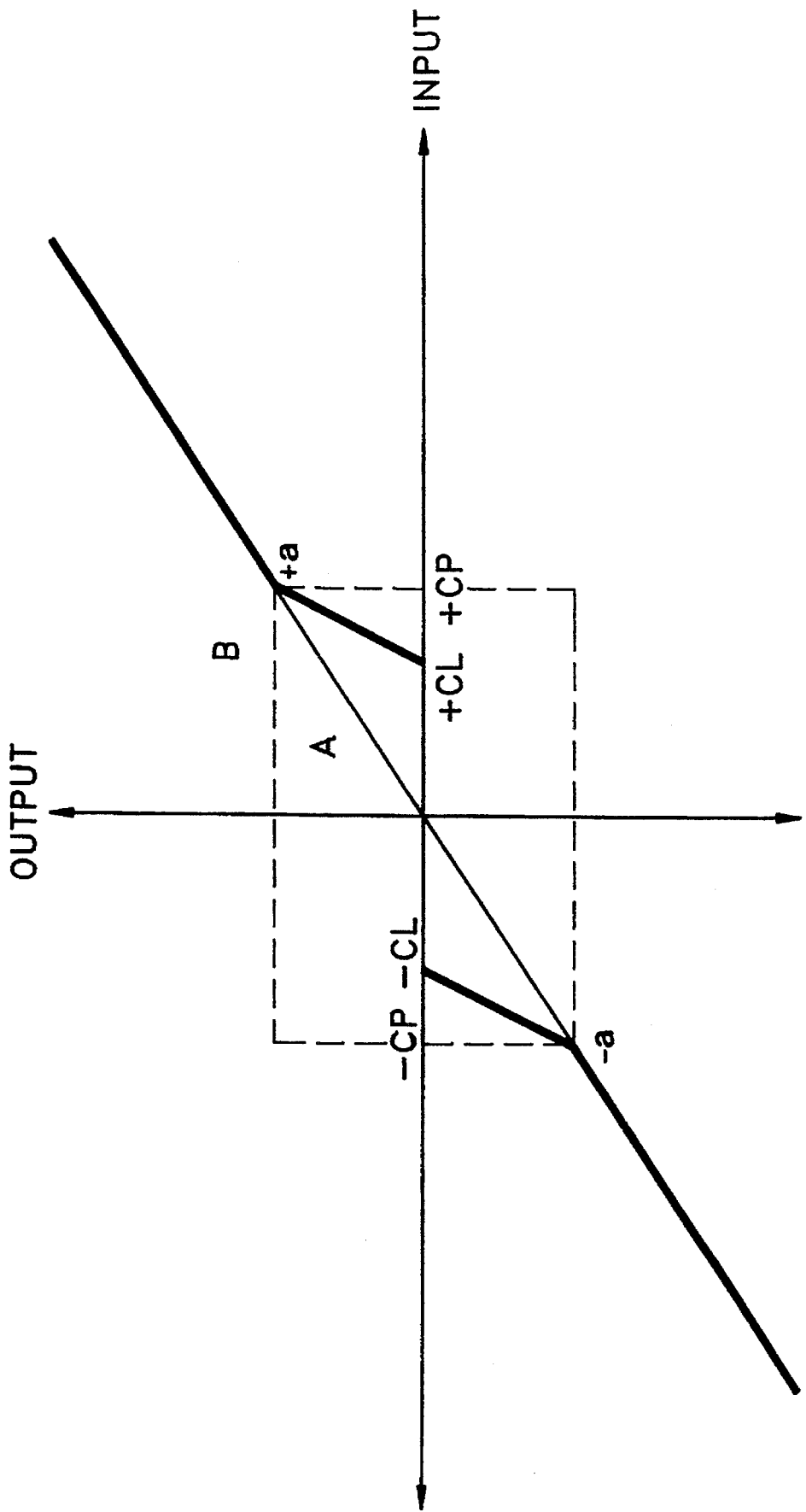
FIG. 7A is graph showing the input/output characteristics of a look-up table LUT1 stored in a read-only memory 58 in the FIG. 5 detail enhancement circuit.

In the FIG. 5 detail enhancement circuitry, if input signals are cored at a predetermined core level by reading from the ROM 58 storing LUT1 having such input and output characteristics as shown in FIG. 7A, the noise included in the input signals can be reduced and the attenuation of the image signal which occurs during the coring process is also prevented. Also, since a smooth change in output signals is derived around the CL value, a blurring phenomenon produced on a screen during display is eliminated.

Figure 6A:
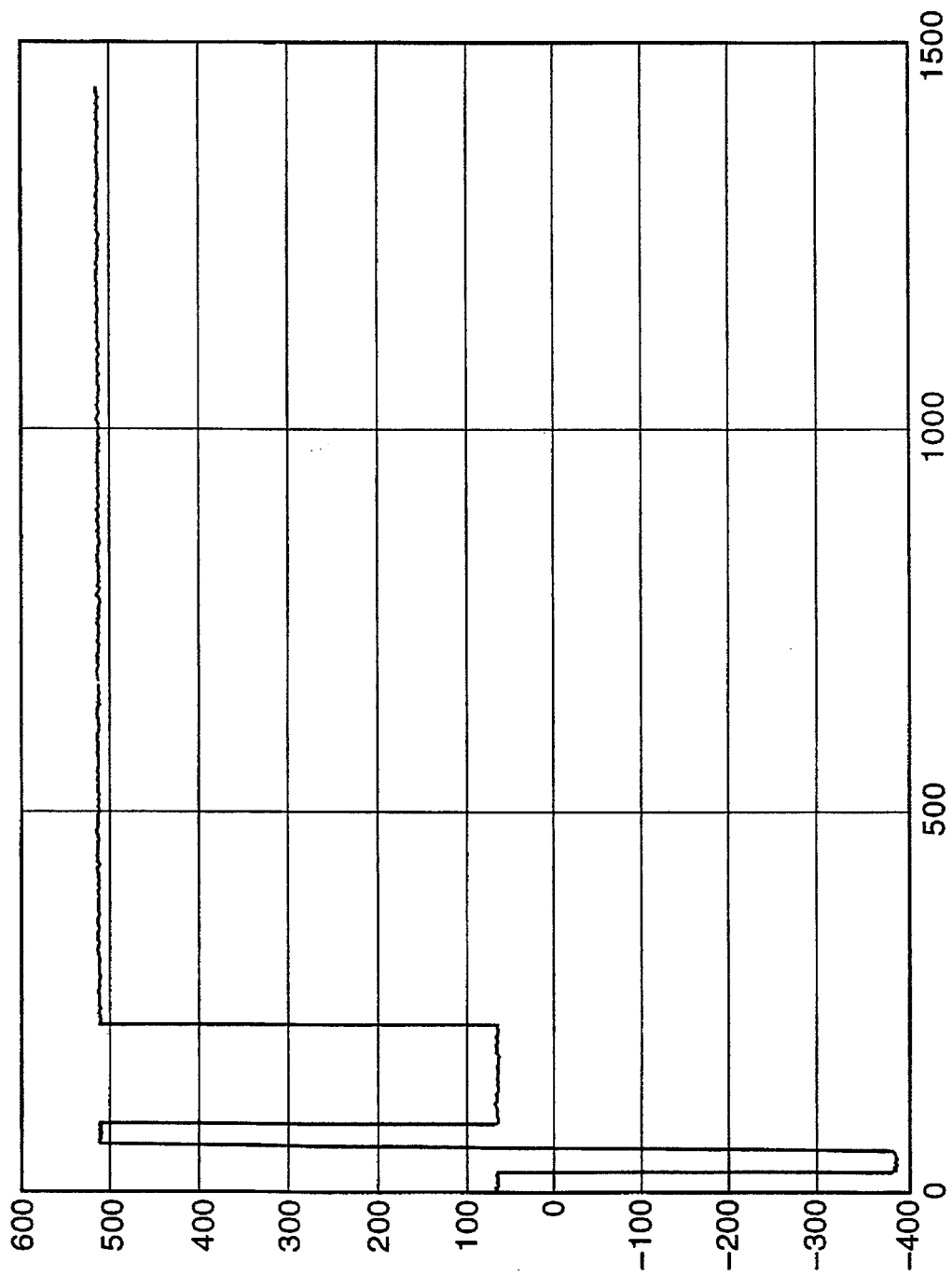
FIGS. 6A–6D are measured results of the input and output signals of FIG. 5.
Figure 6B:
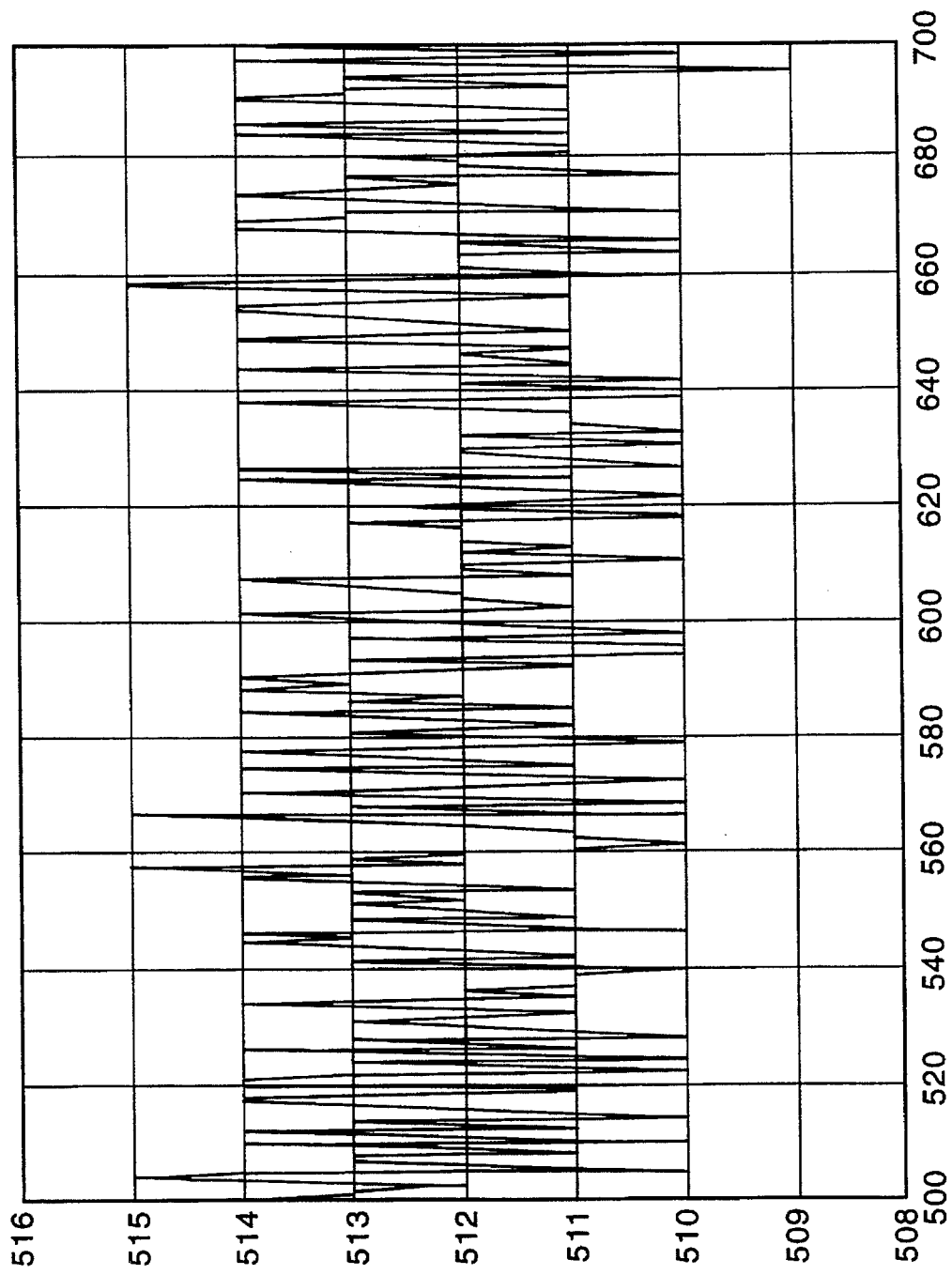
Figure 6C:
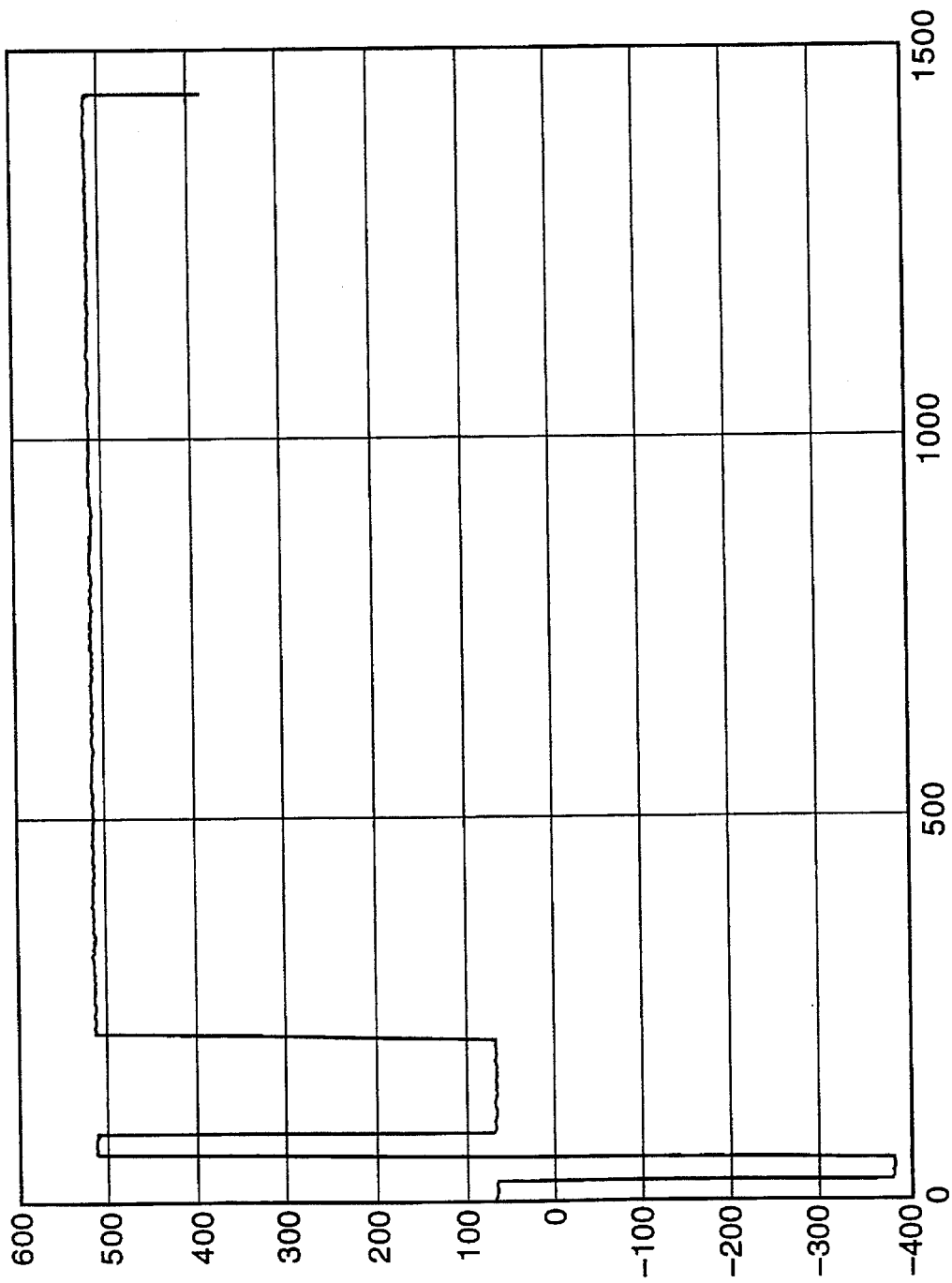
Figure 6D:
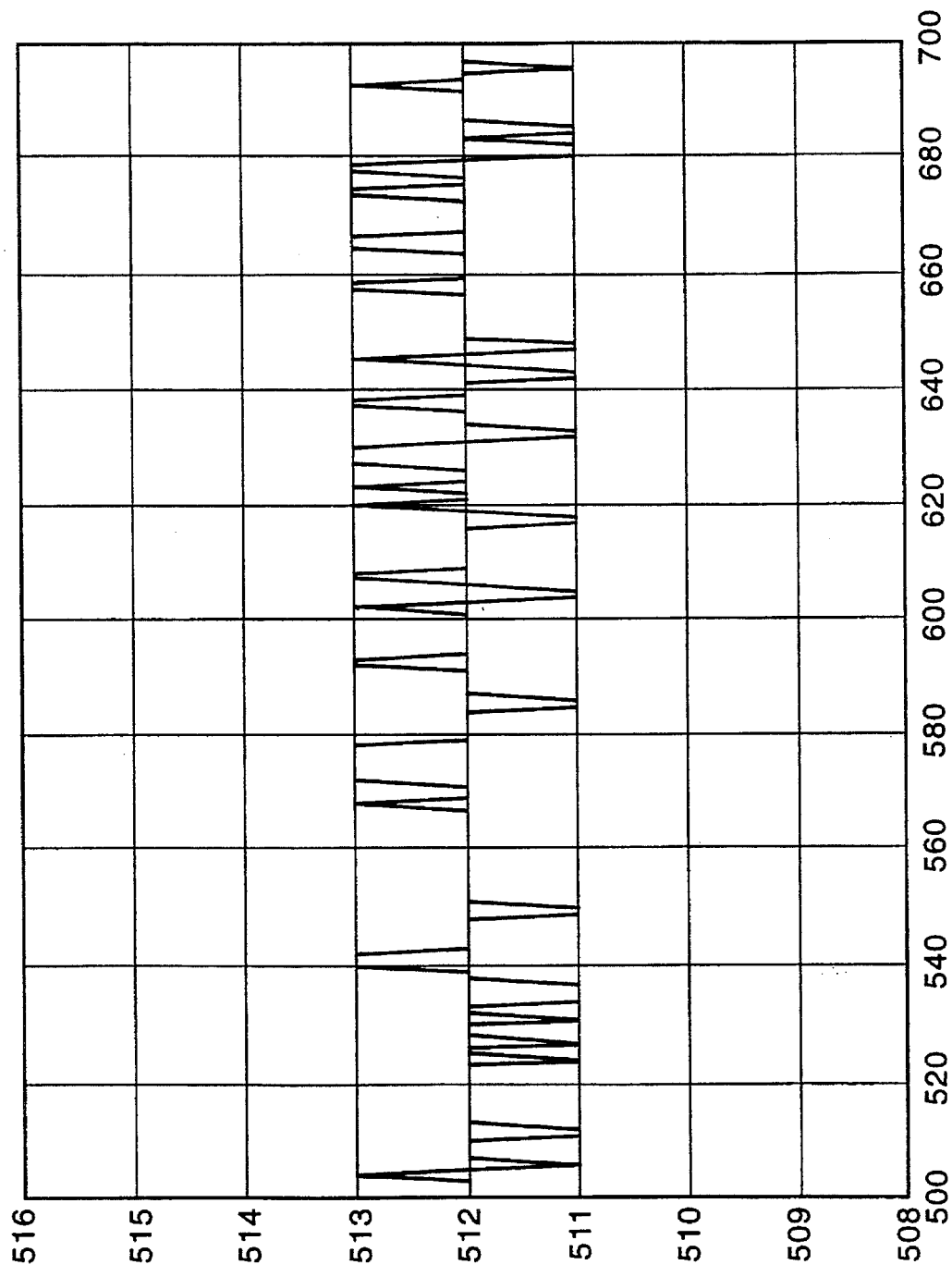

FIGS. 6A to 6D are the measured results of input and output signals shown in FIG. 5. Here, the abscissa and ordinate represent the number of samples and magnitude, respectively. FIG. 6A shows an original image signal in the case when the original image signal, the signal-to-noise ratio of which is 50 dB, is subjected to 10-bit analog/digital sampling at 48.6 mHz rate. The signal is a 50% white signal with 1,440 samples per line. FIG. 6B shows a magnified signal of the original image signal shown in FIG. 6A. FIG. 6C shows the original image signal shown in FIG. 6A, the noise accompanying which is decreased after passing through the detail enhancement circuit shown in FIG. 5. FIG. 6D shows a magnified signal of the image signal shown in FIG. 6C. The S/N ratio of the image signal shown in FIG. 6C is measured as 57.5 dB, which represents an improvement by about 7.5 dB over the original image signal shown in FIG. 6A.

FIG. 7A shows an input/output characteristic of the noise canceling look-up table (LUT1) stored in the ROM 58, which supplies its read out in two's complement arithmetic. Referring to FIG. 7A, the input signals (the abscissa) are divided into a section A and a section B, and a critical point (CP) represents a boundary value between the sections A and B, that is, a reference value for noise identification.

If the signal values addressing the ROM 58 storing LUT1 are greater than +CP or are less than −CP (in the section B), the output signal (ordinate values) follows the input signal linearly. However, if the signal values addressing the ROM 58 storing the noise-canceling LUT1 are in the section A between −CL and +CL, the output signal is zero; and if the signal values signal values addressing the ROM 58 are between −CP and −CL, or between +CL and +CP, the output signal increases in the form of a first-order function up to the +a point from +CL on the abscissa or up to the −a point from −CL on the abscissa, as shown in FIG. 7A.

Referring back to FIG. 5, the detail component canceling means 59 subtracts the horizontal and vertical detail components supplied by the horizontal/vertical detail component summing means 57 from the 1 H-delayed signals supplied by the first 1 H delay line 51 for the respective red, green and blue channels using subtractors 59a, 59b and 59c, respectively. The resulting detail-free red, green and blue signals are then supplied to detail component summing means 60 and are also supplied to the read-only memory 61 as addressing therefor.

The detail component summing means 60 sums the 1 H-delayed image signals including no detail component and output from the detail component canceling means 59 with the horizontal/vertical detail components from which noise is canceled read from the ROM 58 storing LUT1. Adders 60a, 60b and 60c provide this summation for the red, green and blue channels, respectively. The summed results are supplied to enhanced-detail signal supplying means 62.

Figure 7B:
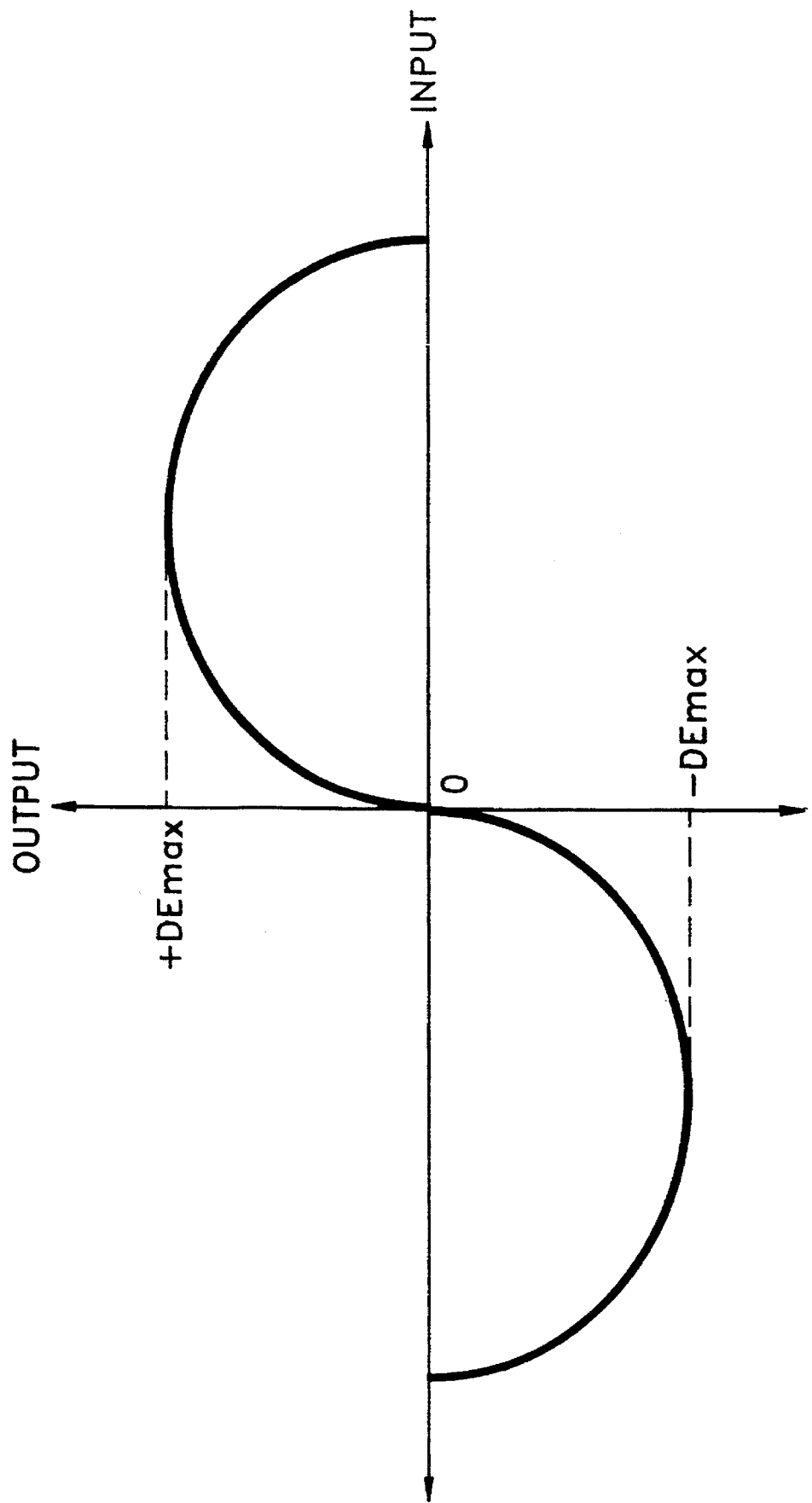
FIG. 7B is a graph showing the input/output characteristics of a look-up table LUT2 stored in a read-only memory 61 in the FIG. 5 detail enhancement circuit.

FIG. 7B shows the input/output characteristic of the detail enhancement amount determining look-up table LUT2 stored in the ROM 61, which supplies its read out in two's complement arithmetic. The detail enhancement amount determining look-up table LUT2 determines the corresponding one among the detail enhancement amounts ranging from zero to the respective maximum detail enhancement amounts ($+DE_{max}$ and $-DE_{max}$) with respect to the magnitude of the input horizontal and vertical detail components, per FIG. 7B, and supplies the determined detail enhancement amount. The ROM 61 determines in accordance with LUT2 stored therewithin the detail enhancement amount with respect to the input horizontal and vertical detail components supplied from the ROM 58. The determined detail enhancement amount is read from the ROM 61 to the enhanced-detail signal supplying means 62.

Finally, the enhanced-detail signal supplying means 62 sums the detail enhancement amount of the horizontal and vertical detail components determined from LUT2 as stored in the ROM 61 with the signals supplied from the detail component summing means 60. Adders 62a, 62b and 62c provide this summation for the red, green and blue channels, respectively. The sum output signals from the adders 62a, 62b and 62c provide enhanced-detail signals for the red, green and blue channels R', G' and B', respectively.

Since noise cancellation must be carried out separately in the red, blue and green channels, in practice the ROM 58 advantageously comprises three separate ROMs each storing LUT1, which separate ROMs are individually addressed by the sum outputs of the adders 57a, 57b and 57c, respectively. The individual ROMs with fewer bits in their read addresses have fewer storage locations than a single ROM with read addresses composed of all the bits in the sum outputs of the adders 57a, 57b and 57c. The simplicity of the LUT1 system characteristic permits the characteristic to be generated in digital hardware rather than having to be stored in ROM as one skilled in the art of digital design will readily appreciate.

The ROM 61 may comprise three separate ROMs each storing LUT2. However, a single ROM can supply similar detail enhancement values, but less affected by noise when its addressing is indicative that the detail is luminance related. In these address regions, the detail enhancement is determined primarily from the lower-noise green-channel portions of the address. Addressing the ROM 61 with the cored read-output of the ROM 58, rather than parallelly addressing the ROMs 58 and 61, avoids the need for ROM 61 storing a number of zero values for low ROM 58 input address values. Rather than separately supplying cored detail to the R, G and B channels from ROM 58 via a first set of adders 60 and supplying enhanced cored detail to the R, G and B channels from ROM 61 via a second adders 62, it should be possible to supply the combined detail components from a ROM to the R', G' and B' channels via a single set of adders, the inventor points out.

Figure 8:
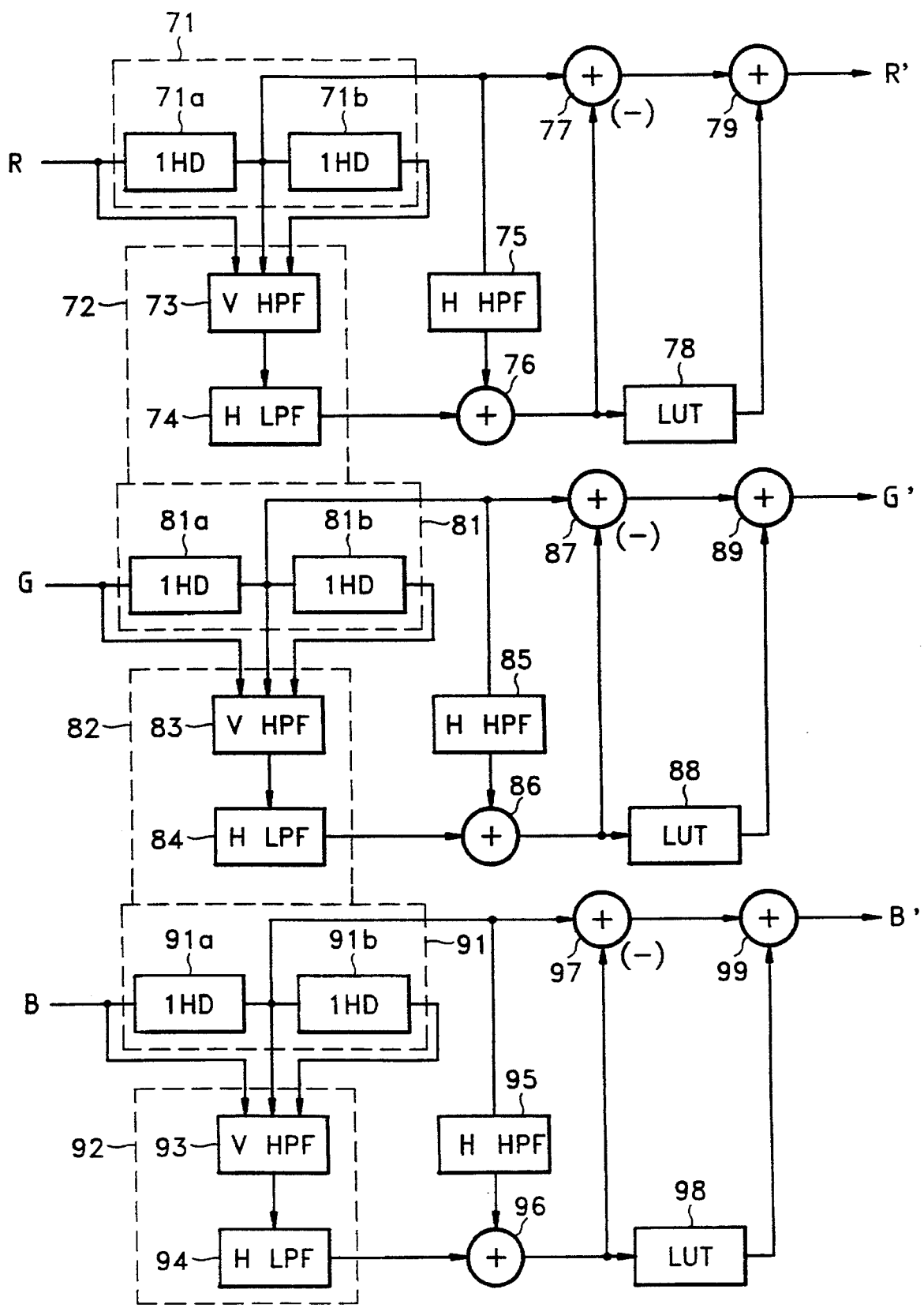
FIG. 8 is a block diagram of a detail enhancement circuit according to a third embodiment of the invention.

FIG. 8 is a block diagram of such a detail enhancement circuit. The FIG. 8 detail enhancement circuit includes delay means 71, 81 and 91; vertical detail component extracting means 72, 82 and 92; horizontal detail component extracting means 75, 85 and 95; horizontal/vertical detail component summing means 76, 86 and 96; detail component canceling means 77, 87 and 97; read-only memories (ROMs) 78, 88 and 98 storing look-up tables (LUTs) used for canceling noise and for determining the amount of detail enhancement; and enhanced-detail signal supplying means 79, 89 and 99 for the red, green and blue channels, respectively. More particularly, the delay means 71 in the red channel comprises a first 1 H delay line 71a and a second 1 H delay line 71b; the delay means 81 in the green channel comprises a first 1 H delay line 81a and a second 1H delay line 81b; and the delay means 91 in the blue channel comprises a first 1 H delay line 91a and a second 1 H delay line 91b. Also, more particularly, the vertical detail component extracting means 72 in the red channel comprises a vertical highpass filter 73 and a horizontal lowpass filter 74; the vertical detail extracting means 82 in the green channel comprises a vertical highpass filter 83 and a horizontal lowpass filter 84; and the vertical detail extracting means 92 in the blue channel comprises a vertical highpass filter 93 and a horizontal lowpass filter 94.

Figure 9:
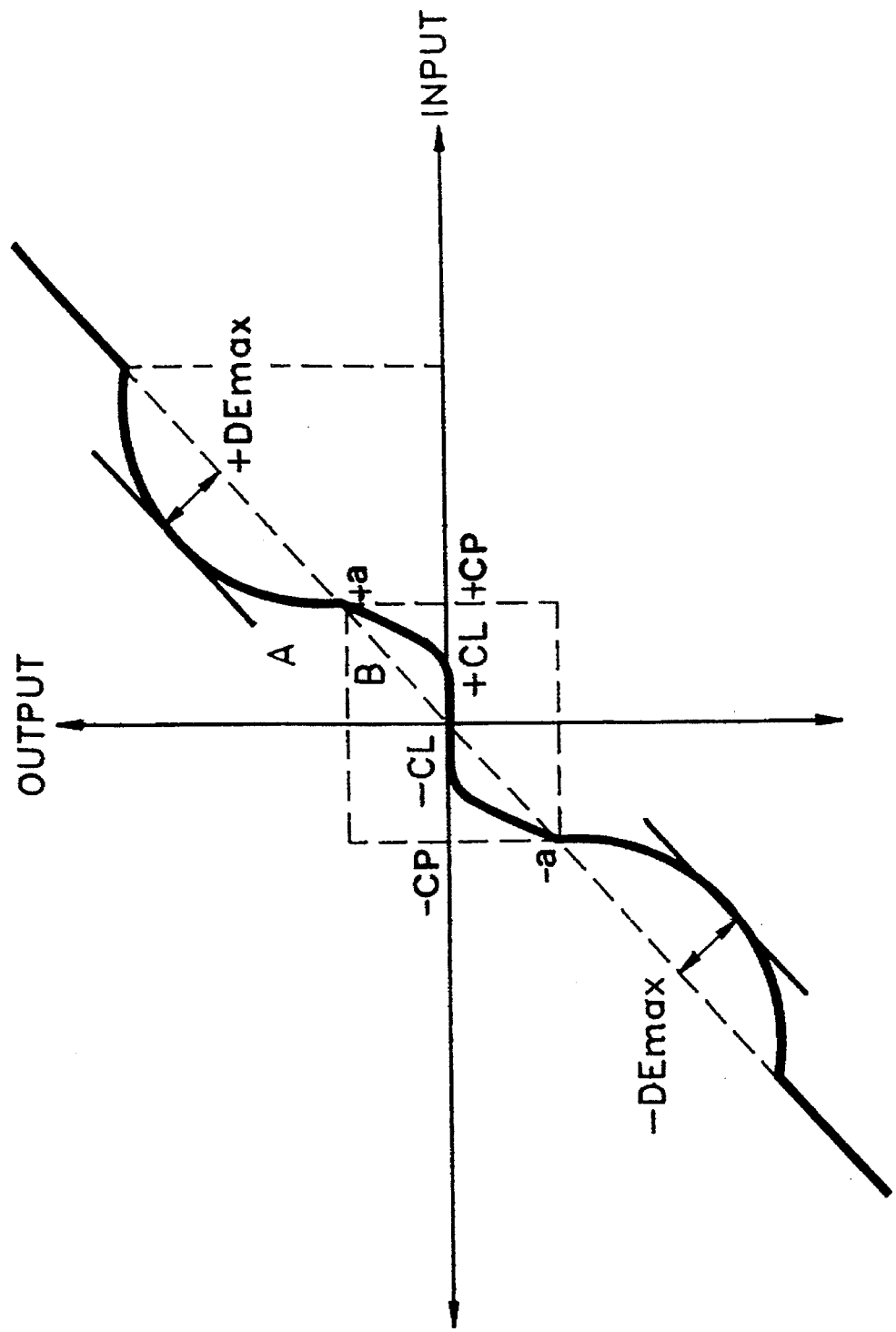
FIG. 9 is graph showing the input/output characteristics of the look-up table stored in read-only memories 78, 88 and 98 in the FIG. 8 detail enhancement circuit.

FIG. 9 is graph showing the input versus output characteristics of the noise canceling and detail enhancement amount determining look-up table (LUTs) stored in the ROMs 78, 88 and 98 of FIG. 8. The operation of the FIG. 8 detail enhancement circuitry will now be described in detail with reference both to FIGS. 8 and 9. The operations of the delay means 71, 81 and 91; the vertical detail component extracting means 72, 82 and 92; the horizontal detail component extracting means 75, 85 and 95; and the horizontal/vertical detail component summing means 76, 86 and 96 respectively correspond to the operations of the delay means 11, 21 and 31; the vertical detail component extracting means 12, 22 and 32; the horizontal detail component extracting means 15, 25 and 35; and the horizontal/vertical detail component summing means 16, 26 and 36 of the FIG. 3 detail enhancement circuit. The collective operations of the delay means 71, 81 and 91 correspond to the operation of the delay means 50 of the FIG. 5 detail enhancement circuit. The collective operations of the vertical detail component extracting means 72, 82 and 92 correspond to the operation of the vertical detail component extracting means 53 of the FIG. 5 detail enhancement circuit. The collective operations of the horizontal detail component extracting means 75, 85 and 95 correspond to the operation of the horizontal detail component extracting means 56 of the FIG. 5 detail enhancement circuit. And the collective operations of the horizontal/vertical detail component summing means 76, 86 and 96 correspond to the operation of the horizontal/vertical detail component summing means 57 of the FIG. 5 detail enhancement circuit. The operations of the detail component canceling means 77, 87 and 97 respectively correspond to the operations of the subtractors 59a, 59b and 59c in the detail component canceling means 59 of the FIG. 5 detail enhancement circuit.

Referring to FIG. 9, the input signals (the abscissa) are divided into a section A and a section B, and a critical point (CP) represents a boundary value between the sections A and B, that is, a reference value for noise identification. If the signal values applied to the ROMs 78, 88 and 98 as addresses are greater than +CP or less than −CP (the A section), the noise canceling and detail enhancement amount determining LUTs stored in the ROMs 78, 88 and 98 function for determining the detail enhancement amount, by determining the corresponding one among the detail enhancement amounts ranging from zero to the respective maximum detail enhancement amounts (+$DE_{max}$ and −$DE_{max}$) with respect to the magnitude of the input horizontal and vertical detail components, as shown in FIG. 9, and supply the determined detail enhancement amount. On the other hand, if the signal values applied to the noise-canceling and detail enhancement amount determining LUTs 78, 88 and 98 are less than +CP or greater than −CP (the B section), the noise-canceling and detail enhancement amount determining LUTs 78, 88 and 98 function for canceling the noise.

That is to say, if an input signal is present between −CL and +CL, the output signal is zero. If an input signal is present between −CP and −CL, or between +CL and +CP, the output signal is expressed in the form of an exponentially decreasing function ranging from the +CL point of the abscissa to the +a point, or from the −CL point of the abscissa to the −a point, as shown in FIG. 9.

That is to say, the horizontal and vertical detail components used to address the ROMs 78, 88 and 98 determine by their respective magnitudes the types of output signal the ROMs 78, 88 and 98 supply. If the magnitude of the input signal is less than CP, noise-canceled horizontal and vertical detail component are supplied. If the magnitude of the input signal is greater than CP, horizontal and vertical detail component whose corresponding detail enhancement amounts are determined are supplied. The table entries stored in the ROMs 78, 88 and 98 are supplied therefrom in the form of two's complement numbers.

In the FIG. 8 detail enhancement circuitry, the horizontal and vertical detail components are cored at predetermined core level, or the detail enhancement amount is determined, according to the magnitude of the horizontal and vertical detail components, by using the LUTs 78, 88 and 98 having input/output characteristics as shown in FIG. 9. Even though the S/N ratio is measured with the detail enhancement circuit operating, the S/N ratio is improved, owing to the coring of high-spatial-frequencies suppressing thermal noise.

In the respective detail enhancement circuitry shown in each of FIGS. 3 and 8, each of the red, green and blue channels employs only a single ROM storing a noise canceling and detail enhancement amount determining look-up table. However, depending on a user's intention, separate ROMs for storing a noise canceling look-up table and for storing a detail enhancement look-up table are provided for alternate use in each channel, with only one of the ROMs being selected to be used in accordance with signal conditions in the channel. To simplify the circuitry, the aforementioned signal processing may be used in only one or two of the channels.

Arrangements are also possible where the ROMs for storing a noise canceling look-up table are selected for each channel depending on the expected thermal noise level as conveyed by automatic gain control signal from the video camera.

One skilled in the art will be enabled by the foregoing disclosure to practice the invention with color video processing using camera primary colors other than red, green and blue. In obvious equivalents of the detail enhancement circuitry described above, the look-up tables are such that the polarity of ROM read-out is reversed and the read-out is supplied as subtrahend input signal to a digital subtractor rather than as a summand to a digital adder; the claims are to be construed so as to include such obvious equivalents within their scopes.

What is claimed is:

1. A method of selectively enhancing detail or suppressing noise in a video signal, which said video signal sometimes includes relatively low horizontal spatial frequencies, which said video signal sometimes includes relatively high horizontal spatial frequencies, which said video signal sometimes includes relatively high vertical spatial frequencies, and which said video signal sometimes includes relatively low vertical spatial frequencies, comprising the steps of:

extracting a horizontal detail signal desciptive of said relatively high horizontal spatial frequencies and a vertical detail signal desciptive of said relatively high vertical spatial frequencies from an input signal version of said video signal previous to enhancing detail or suppressing noise of said video signal in an output signal version thereof;

combining said horizontal detail signal and said vertical detail signal to generate a combined detail signal;

combining said combined detail signal with reversed polarity with said input signal version of said video signal to suppress noise within said video signal in said output version thereof, only whenever the magnitude of said combined detail signal is less than a reference value for noise identification; and combining said combined detail signal additively with said input signal version of said video signal to enhance detail within said video signal in said output version thereof, only whenever the magnitude of said combined detail signal is more than said reference value for noise identification.

2. A detail enhancement method as claimed in claim 1 carried out by digital processing, wherein said horizontal detail signal, said vertical detail signal, and said combined detail signal are in the form of two's complement numbers.

3. A detail enhancement method as claimed in claim 2; wherein, owing to said combined detail signal at times combining additively with said input signal version of said video signal, said output signal version of said video signal tends to have more bits than said input signal version of said video signal; and wherein said detail enhancement method further comprises the step of:

limiting the excursion of said output signal version of said video signal in the direction of increase, to keep the number of bits in said output signal version of said video signal no greater than the number of bits in said input signal version of said video signal.

4. A detail enhancement circuit comprising:

filter circuitry for extracting horizontal and vertical detail components included in an input video signal to provide a filter response;

combining circuitry for combining a noise canceling signal or a detail enhancement signal with said input video signal to generate a video output signal;

noise canceling and detail enhancement amount determining means responding to said filter response, for generating said noise canceling signal in negative response to said filter response if the magnitudes of the horizontal and vertical detail components extracted in said extracting means are lower than a reference value for noise identification, and for generating said detail enhancement signal in positive response to said filter response if the magnitudes of the horizontal and vertical detail components extracted in said extracting means are higher than the reference value for noise identification.

5. A detail enhancement circuit as claimed in claim 4, further comprising:

means for limiting the excursion of said output video signal to keep the number of bits therein no greater than the number of bits in said input video signal.

6. A detail enhancement circuit as claimed in claim 4, wherein said noise canceling signal or detail enhancement signal from said noise canceling and detail enhancement amount determining means are in the form of two's complement numbers.

7. A detail enhancement circuit as claimed in claim 5, wherein said noise canceling and detail enhancement amount determining means includes memory storing a look-up table.

8. A detail enhancement circuit as claimed in claim 7, wherein, if the signal values applied to said noise canceling and detail enhancement amount determining means are greater than a positive reference value for noise identification or less than a negative reference value for noise identification, said noise canceling and detail enhancement amount determining means determines the corresponding one among the detail enhancement amount ranging from zero to the respective maximum detail enhancement amounts with respect to the magnitude of the input horizontal and vertical detail components, and supplies the determined detail enhancement amount to said combining circuitry as said detail enhancement signal.

9. A detail enhancement circuit as claimed in claim 7, wherein, if the signal values applied to said noise-canceling and detail enhancement amount determining means are less than a positive reference value for noise identification or greater than a negative reference value for noise identification, said noise-canceling and detail enhancement amount determining means generates a negative response in the form of a first-order increasing function with respect to the magnitude of the input horizontal and vertical detail components and supplies the result to said combining circuitry as said noise canceling signal.

10. A detail enhancement circuit as claimed in claim 7, wherein, if the signal values applied to said noise-canceling and detail enhancement amount determining means are less than a positive reference value for noise identification or greater than a negative reference value for noise identification, said noise-canceling and detail enhancement amount determining means generates a negative response in the form of an exponentially decreasing function with respect to the magnitude of the input horizontal and vertical detail components and supplies the result to said combining circuitry as said noise canceling signal.

11. A detail enhancement circuit comprising:

extracting means for extracting horizontal and vertical detail components included in the image signal supplied from at least one channel among the red, green and blue channels;

noise canceling means for canceling noise by coring the horizontal and vertical detail components supplied from said extracting means for the respective channels;

detail enhancement amount determining means for determining the detail enhancement amount corresponding to the magnitudes of the noise-canceled horizontal and vertical detail components supplied from said noise canceling means for the respective channels; and supplying means for supplying an enhanced-detail image signal for the respective channels obtained by summing the 1 H-delayed signal of the image signal supplied from at least one channel among the red, green and blue channels, with the horizontal/vertical detail components whose detail enhancement amount is determined in said detail enhancement amount determining means.

12. A detail enhancement circuit as claimed in claim 11, wherein said noise canceling means and said detail enhancement amount determining means each includes a separate look-up table stored in memory.

13. A detail enhancement circuit as claimed in claim 12, wherein, if the signal values applied to said noise canceling means are less than a positive reference value for noise identification or greater than a negative reference value for noise identification, said noise-canceling and detail enhancement amount determining means cores said detail components in the form of a first-order increasing function with respect to the magnitude of the input horizontal and vertical detail components and supplies the result.

14. A detail enhancement circuit as claimed in claim 12, wherein, if the signal values applied to said noise-canceling means are less than a positive reference value for noise identification or greater than a negative reference value for noise identification, said noise-canceling and detail enhancement amount determining means cores said detail components in the form of an exponentially decreasing function with respect to the magnitude of the input horizontal and vertical detail components and supplies the result.

15. A detail enhancement circuit as claimed in claim 12, wherein, if the signal values applied to said detail enhancement amount determining means are greater than a positive reference value for noise identification or less than a negative reference value for noise identification, said detail enhancement amount determining means determines the corresponding one among the detail enhancement amounts ranging from zero to the respective maximum detail enhancement amounts with respect to the magnitude of the input horizontal and vertical detail components, and supplies the determined detail enhancement amount.

16. Circuitry for enhancing detail in a video signal having horizontal scan lines, said circuitry comprising:

a memory connected to receive an addressing signal and to read from a look-up table stored in said memory for supplying a memory output signal, said look-up table supplying said memory output signal as the negative of said addressing signal within a range associated with thermal noise and otherwise supplying said memory output signal of the same polarity as said addressing signal outside said range;

filter circuitry responding to said video signal for generating a video detail signal descriptive of both the vertical and horizontal detail of said video signal, said video detail signal being supplied to said memory as said addressing signal; and circuitry for combining said memory output signal with said video signal from which the vertical and horizontal detail was extracted to generate said addressing signal responsive to which said memory signal is supplied from said memory, the result of said combining being an enhanced-detail video signal cored for suppressing thermal noise when there is little or no detail.

17. Circuitry as set forth in claim 16, wherein said filter circuitry comprises:

first and second delay lines, each having a respective input port and having a respective output port for supplying a response to signal received at its said input port after a delay substantially equal to the period (1 H) of one of said horizontal scan lines, the input port of said first delay line connected for receiving said video signal and for supplying from its output port a 1 H-delayed response to said video signal, the input port of said second delay line connected for receiving said 1 H-delayed response to said video signal and for supplying from its output port a 2 H-delayed response to said video signal;

a weight-and sum circuit connected for receiving said video signal, said 1 H-delayed response to said first video signal, and said 2 H-delayed response to said first video signal and supplying a vertical highpass filtered response to said video signal;

a first horizontal lowpass filter, having an input port connected to receive from first weight-and sum circuit said vertical highpass filtered response to said video signal, and having an output port;

a first horizontal highpass filter, having an input port connected to receive 1 H-delayed response to said video signal from the output port of said first delay line, and having an output port;

a first adder having a first input port to which the output port of said first horizontal lowpass filter connects, having a second input port to which the output port of said first horizontal highpass filter connects, and having an output port from which said addressing signal is supplied.

18. Circuitry as set forth in claim 17, wherein said circuitry for combining said memory output signal comprises:

a second adder having a first input port connected to receive 1 H-delayed response to said video signal from the output port of said first delay line, having a second input port connected to receive said memory output signal, and having an output port for supplying said enhanced-detail video signal cored for suppressing thermal noise when there is little or no detail.

19. Circuitry for noise coring detail in a video signal having horizontal scan lines, comprising:

a first memory connected to receive a first addressing signal and to read from a first look-up table stored in said first memory for supplying a first memory output signal, said first look-up table providing said first memory output signal of zero value within a range associated with thermal noise and otherwise providing said first memory output signal of the same polarity as said first addressing signal outside said range;

filter circuitry responding to said video signal for generating a video detail signal descriptive of both the vertical and horizontal detail of said video signal, said video detail signal being supplied to said first memory as said first addressing signal circuitry for differentially combining said video detail signal with said video signal from which said video detail signal was generated, thereby generating a detail-free video signal;

circuitry for combining said first memory output signal with said detail-free video signal, the result of said combining being a cored video signal that is cored for suppressing thermal noise when there is little or no detail.

20. Circuitry as set forth in claim 19, wherein said filter circuitry comprises:

first and second delay lines, each having a respective input port and having a respective output port for supplying a response to signal received at its said input port after a delay substantially equal to the period (1 H) of one of said horizontal scan lines, s the input port of said first delay line connected for receiving said video signal and for supplying from its output port a 1 H-delayed response to said video signal, the input port of said second delay line connected for receiving said 1 H-delayed response to said video signal and for supplying from its output port a 2 H-delayed response to said video signal;

a weight-and sum circuit connected for receiving said video signal, said 1 H-delayed response to said first video signal, and said 2 H-delayed response to said first video signal and supplying a vertical highpass filtered response to said video signal;

a first horizontal lowpass filter, having an input port connected to receive from first weight-and sum circuit said vertical highpass filtered response to said video signal, and having an output port;

a first horizontal highpass filter, having an input port connected to receive 1 H-delayed response to said video signal from the output port of said first delay line, and having an output port;

a first adder having a first input port to which the output port of said first horizontal lowpass filter connects, having a second input port to which the output port of said first horizontal highpass filter connects, and having an output port from which said video detail signal is supplied.

21. Circuitry as set forth in claim 20, wherein said circuitry for differentially combining said video detail signal with said video signal from which said video detail signal was generated comprises:

a subtractor having a first input port connected to receive 1 H-delayed response to said video signal from the output port of said first delay line, having a second input port to which the output port of said first adder connects, and having an output port for supplying said detail-free video signal.

22. Circuitry as set forth in claim 21, wherein said circuitry for combining said first memory output signal with said detail-free video signal comprises:

a second adder having a first input port to which said first memory output signal is applied, having a second input port said detail-free video signal is applied, and having an output port for supplying said cored video signal that is cored for suppressing thermal noise when there is little or no detail.

23. Circuitry as set forth in claim 22 followed by circuitry for enhancing detail outside said range of said input addresses associated with thermal noise comprising:

a third adder having a first input port to which the output port of said second adder connects, having a second input port, and having an output port; and a second memory connected to receive said first memory output signal as a second addressing signal and to read in accordance with said second addressing signal from a second look-up table stored in said second memory to the second input port of said third adder, for conditioning said third adder to supply enhanced-detail video signal from its output port.

24. Circuitry as set forth in claim 22, wherein read-out from the first look-up table stored in said first memory to the second input port of said second adder is such as to condition said second adder for supplying enhanced-detail video signal from its output port outside said range of said input addresses associated with thermal noise.

\* \* \* \* \*